United States Patent
Garrard et al.

(10) Patent No.: US 6,906,328 B2
(45) Date of Patent: Jun. 14, 2005

(54) GAMMA CAMERA WORKFLOW AUTOMATION

(75) Inventors: Jody L. Garrard, Elk Grove, CA (US); Jeff A. Hallett, Livermore, CA (US); Gary L. Stephens, Burlingame, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 238 days.

(21) Appl. No.: 10/167,833

(22) Filed: Jun. 12, 2002

(65) Prior Publication Data

US 2003/0230723 A1 Dec. 18, 2003

(51) Int. Cl.$^7$ .............................. G01T 1/20
(52) U.S. Cl. .................. 250/363.1; 250/370.09; 250/363.02
(58) Field of Search ............... 250/361.1, 370.09, 250/363.02, 363.03, 363.04, 363.05, 363.08, 363.1; 378/146, 147, 148, 196

(56) References Cited

U.S. PATENT DOCUMENTS

| | | | | |
|---|---|---|---|---|
| 5,519,223 A | | 5/1996 | Hug et al. ............... | 250/363.1 |
| 6,091,070 A | * | 7/2000 | Lingren et al. ......... | 250/370.09 |
| 6,140,649 A | * | 10/2000 | Lonn ...................... | 250/363.04 |
| 6,177,675 B1 | * | 1/2001 | Gagnon et al. .......... | 250/363.1 |
| 6,441,377 B1 | * | 8/2002 | Hug et al. ............... | 250/363.1 |
| 6,590,214 B1 | * | 7/2003 | Karmalawy .............. | 250/363.1 |

FOREIGN PATENT DOCUMENTS

WO    WO 00/31522    *    6/2000    .......... G01N/23/04

OTHER PUBLICATIONS

PET Advance Positron Emission Tomography System, GE Medical Systems Advertising Brochure, Nov. 1999.

* cited by examiner

*Primary Examiner*—David Porta
*Assistant Examiner*—Faye Polyzos
(74) *Attorney, Agent, or Firm*—Fay, Sharpe, Fagan, Minnich & McKee

(57) ABSTRACT

A method (200) for setting up and performing a medical imaging session of a subject using a gamma camera (12, 52) includes selecting (208) an imaging procedure on an input terminal (72). A procedure table (76) is electronically accessed to retrieve at least one of: (1) an identification (210) of a collimator (30) to be used with a detector head (14, 54) in the selected imaging procedure; and (2) an initial imaging position of the detector head (14, 54) for the selected imaging procedure. A currently mounted collimator that is currently attached to the detector head (14, 54) is electronically identified. At least one of: (1) loading (216) the identified collimator onto the detector head (14, 54); and (2) positioning (220) the detector head in the identified initial imaging position, is automatically controlled.

21 Claims, 6 Drawing Sheets

GAMMA CAMERA WORKFLOW AUTOMATION

BACKGROUND OF THE INVENTION

The present invention relates to the diagnostic imaging arts. It particularly relates to nuclear medical imaging using gamma cameras each including at least a two-dimensional scintillation detector and a collimator, and will be described with particular reference thereto. However, the invention will also find application in conjunction with other imaging modalities.

In nuclear medical imaging, a subject is administered a radiopharmaceutical by ingestion, injection, or another delivery pathway. The radiopharmaceutical is preferably absorbed by one or more organs of interest, such as bone tissue, the liver, the heart, the vascular system, tumors, or other organs or tissues. Radiation generated by the radiopharmaceutical is emitted from the body and detected by one or more detector heads of a gamma camera. Each detector head typically include a scintillation crystal or crystal array facing the subject and an array of photomultiplier tubes, photodiodes, or other optical detectors arranged to detect scintillation events due to radiation impinging upon the scintillation crystal.

A collimator of lead or another radiation-absorbing material is mounted to each head between the scintillation surface and the subject. Typically, the collimator includes a honeycomb of bores that define the trajectory of received radiation. The collimators of lead or other material are usually fairly massive, often weighing around 100 pounds to 300 pounds each, and are detachable so that an optimally designed collimator can be installed for a particular imaging session. Optionally, energy-selective filters are also interposed in front of the detector face. The filter can be integrated into the collimator.

Typically, a nuclear camera includes a family of collimators. Thicker collimators with small bores provide higher resolution. Thinner collimators and collimators with larger bores provide higher count rates. Collimators whose bores are angled are used for magnification and reduction imaging. Specialized collimators that focus on two displaced regions of the subject are also used.

Typically, the patient is brought into the imaging suite and positioned on a patient couch of the nuclear camera. The operator selects a diagnostically appropriate protocol for the patient's medical condition on an imaging console. In more sophisticated nuclear cameras, the console can determine whether the appropriate collimator for the scan is on the nuclear camera heads. In other nuclear cameras, the operator manually inspects the collimators to determine if the right collimator is present.

In most instances, the collimators need to be changed. To change the collimators, the operator moves the detector heads to the appropriate collimator changing position. The operator then rolls in a collimator holding cart, which supports the currently installed collimators as they are disconnected. The cart is then used to transport the collimators to a storage location where it is further used to pick-up the proper set of collimators. The appropriate set of collimators on the cart are wheeled up to the detector heads and manually mechanically coupled. This operation typically requires 10–15 minutes of operator time.

If the nuclear camera is equipped with an automatic collimator exchanger as shown in U.S. Pat. No. 5,519,223 issued to Hug, et al, the operator leaves the imaging console and crosses the room to the collimator exchanger. On a control panel for the collimator exchanger, the operator selects the appropriate collimators and instructs the exchanger to start.

Once the collimators have been changed, the detector heads are moved from the collimator changing position to the appropriate orientation for imaging. In most nuclear cameras, the operator uses controls located on the gantry to move the detector heads manually to the proper position. On some nuclear cameras, the operator codes the desired detector head position on the gantry control and the gantry then rotates the detector head to the selected angular position. Once the detector head is in the selected angular position, the proximity of the detector head to the patient is controlled by the operator at the gantry.

Once the heads are appropriately positioned angularly, and distance-wise, the operator then moves the heads to the appropriate position along the patient for the imaging procedure.

Once the appropriate collimators have been mounted and the heads properly positioned, the operator returns to the imaging console and conducts an imaging procedure with the selected protocol. During the whole set-up procedure, the operator either left the patient unattended, or a second attendant was employed to comfort the patient.

The set-up for a selected imaging procedure typically includes: installing a suitable collimator and optional energy-selective filter; positioning the patient relative to the detector heads by moving at least one of the patient support, the gantry, or robotic arms that carry the heads; setting up initial positions for the detector heads with each head position including at least a rotational setting, a detector cant or tilt, and a detector head proximity to the patient. These set-up procedures can take up to 15 minutes or more, and involve substantial intervention of the operator.

Daily quality control procedures which verify and maintain camera alignment and the like are similarly time-consuming and labor-intensive.

The present invention contemplates an improved apparatus and method that overcomes the aforementioned limitations and others.

SUMMARY OF THE INVENTION

According to one aspect of the invention, a method is provided for setting up and performing a medical imaging session of a subject using a gamma camera. An imaging procedure is selected on an input terminal. A procedure table is electronically accessed to retrieve at least one of: (1) an identification of a collimator to be used with a detector head in the selected imaging procedure, and (2) an initial imaging position of the detector head for the selected imaging procedure. A currently mounted collimator that is currently attached to the detector head is electronically identified. At least one of: (1) loading the identified collimator onto the detector head; and (2) positioning the detector head in the identified initial imaging position, is automatically controlled.

According to another aspect of the invention, a nuclear imaging apparatus is provided for imaging a patient who has been administered a radiopharmaceutical. A gamma camera includes at least one detector head. A camera positioning means is provided for positioning the detector head at selected spatial coordinates including at least one angular coordinate. An automated collimator exchanger removes and mounts a collimator onto the detector head. The collimator exchanger includes collimator on the detector head. A procedure lookup table contains parameters associated with a plurality of imaging procedures. The parameters for each procedure include at least: a collimator identification, starting coordinates for the detector head, and an imaging recipe. A graphical user interface effectuates communication between an operator and the nuclear imaging apparatus. An imaging controller communicates with the gamma camera, the camera positioning means, the collimator exchanger, the procedure lookup table, and the user interface to perform a nuclear imaging method.

The nuclear imaging method performed by the imaging controller includes: receiving a selection of a procedure via the graphical user interface; retrieving parameters of the selected procedure from the procedure lookup table; communicating the retrieved collimator identification to the automated collimator exchanger to effectuate mounting of a corresponding collimator onto the detector head; communicating the retrieved starting coordinates for the detector head to the camera positioning means to effectuate moving of the detector head to the starting coordinates; and acquiring imaging data corresponding to radiation produced by a radiopharmaceutical in the patient.

According to yet another aspect of the invention, a nuclear imaging apparatus is disclosed for imaging a radiation-emissive subject. It includes at least one detector head, a subject support supporting the subject, and a means for moving and positioning the head relative to the patient. A camera control means controls at least one of (1) movements of the detector head and (2) loading of the collimators. An acquisition computer retrieves a prerecorded recipe and gamma camera configuration parameters corresponding to an imaging procedure. The acquisition computer electronically communicates instructions to the camera control means to effectuate the imaging procedure. The constructed and electronically communicated instructions include preparatory instructions that automatically at least one of (1) moves the detector head and (2) mounts a selected collimator on the detector head in accordance with the configuration parameters for image data acquisition. A reconstruction means is provided for reconstructing imaging data received from the gamma camera during the imaging procedure into an image representation. A graphical user interface displays the image reconstruction.

One advantage of the present invention resides in substantial reduction in setup time for a nuclear imaging session.

Another advantage of the present invention resides in a reduced likelihood of operator error producing non-optimal imaging or other difficulties.

Another advantage resides in a reduction of personnel needed to conduct a patient imaging session.

Yet another advantage of the present invention resides in simplification of the quality control procedures, imaging session setup process, and other operations related to a nuclear imaging facility.

Numerous additional advantages and benefits of the present invention will become apparent to those of ordinary skill in the art upon reading the following detailed description of the preferred embodiment.

BRIEF DESCRIPTION OF THE DRAWINGS

The invention may take form in various components and arrangements of components, and in various steps and arrangements of steps. The drawings are only for the purpose of illustrating preferred embodiments and are not to be construed as limiting the invention.

DETAILED DESCRIPTION OF THE PREFERRED EMBODIMENTS

Figure 1:
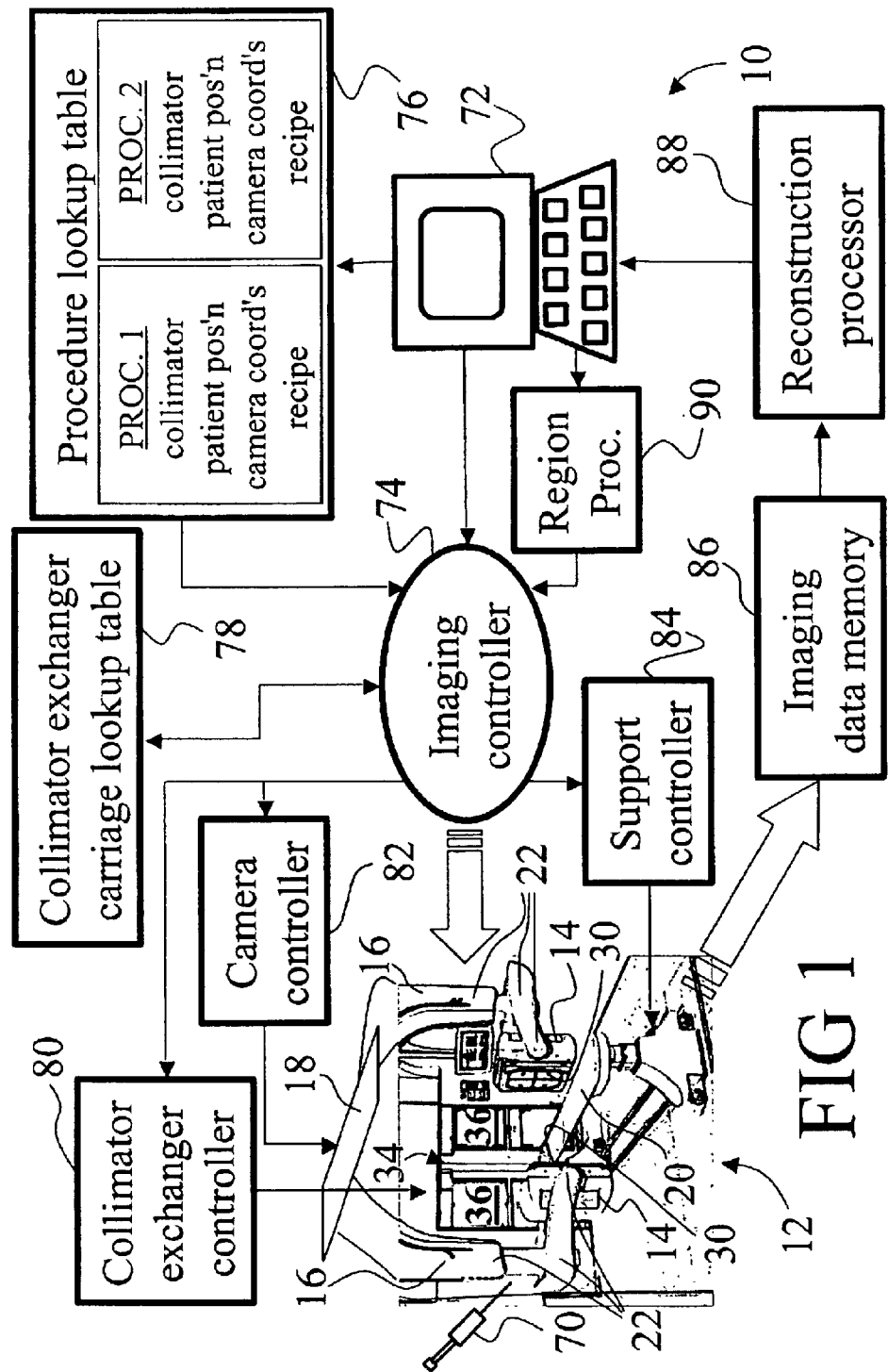
FIG. 1 schematically shows a first embodiment of a nuclear medical imaging apparatus in accordance with an embodiment of the invention.

With reference to FIG. 1, a nuclear imaging system 10 includes a gamma camera 12. One or more detector heads 14, e.g. two heads in FIG. 1, are mounted on robotic arms 16 that in turn mount to an overhead mechanical track 18, e.g. a ceiling track, that moves the robotic arms 16 and attached heads 14 linearly relative to a subject support 20. Each robotic arm 16 includes a plurality of joints 22 that provide a plurality of degrees of movement freedom for the attached head 14, such as rotation about an axis through the head, vertical motion, tomographic rotation about the subject support 20, and the like.

In a preferred embodiment, each detector head 14 includes a scintillator and an array of photomultiplier tubes arranged to view the scintillator and detect optical flashes or scintillations resulting from impingement of radiation particles on the scintillator. Instead of photomultiplier tubes, photodiodes or other optical detectors can be used. Based upon the relative intensities detected by the various photomultiplier tubes during a radiation detection event, the location of the event on the two-dimensional surface of the detector head 14 is determined.

A collimator 30 is arranged between the detector head 14 and a subject to be imaged. The collimator 30 is made of a radiation-absorbing material such as lead, and typically weighs between 100 pounds and 300 pounds. The collimator 30 includes an array of collimating bores, such that the collimator 30 is sometimes called a honeycomb collimator. Only radiation incident upon the collimator 30 within a narrow conical solid angle about the axis of each collimator bore passes through the collimator and reaches the detector face. Mechanical mountings formed into the collimator 30 and the detector head 14 detachably mount the collimator to the detector head.

Figure 2:
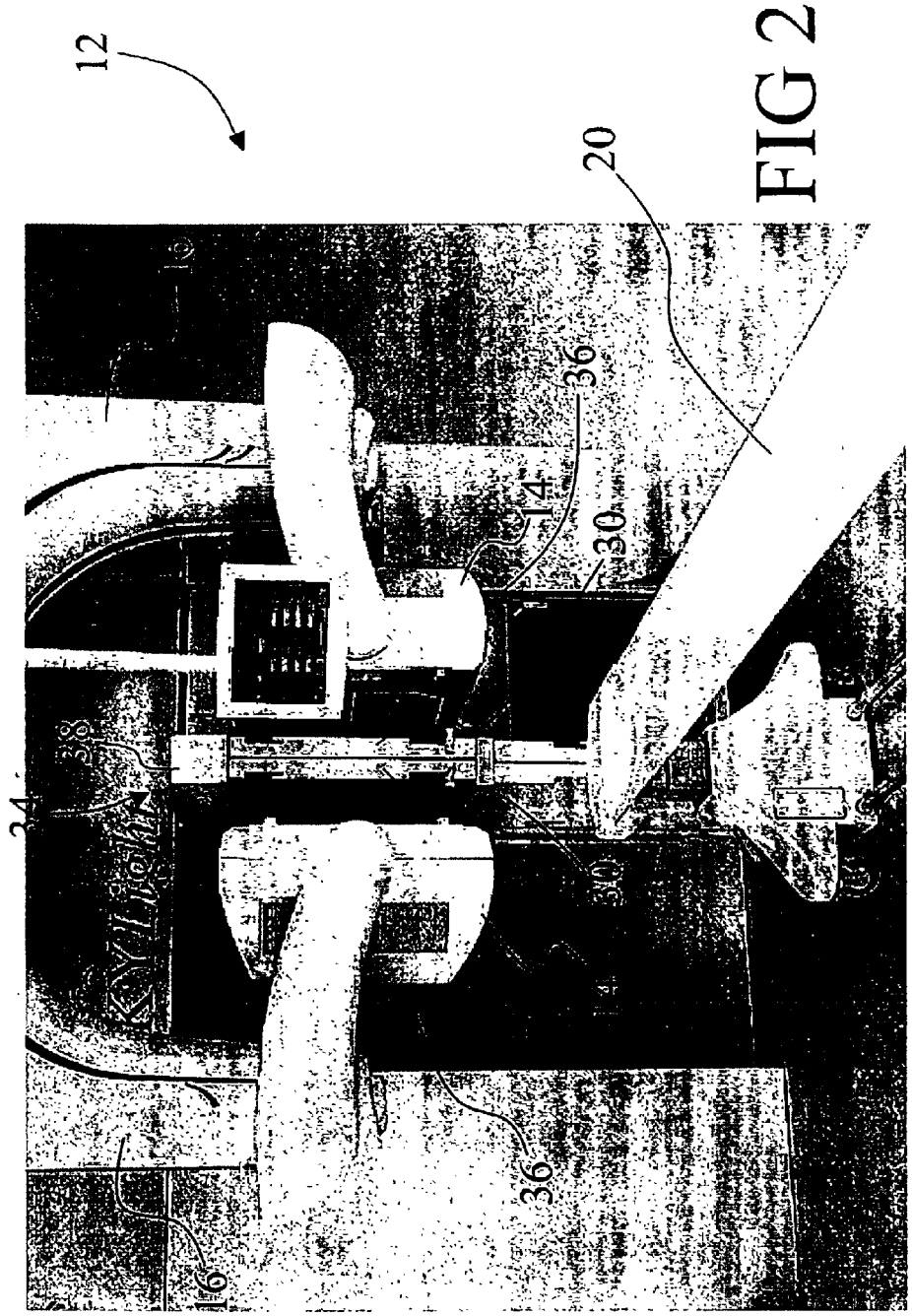
FIG. 2 shows the gamma camera of FIG. 1 in the process of an automated collimator exchange.

With continuing reference to FIG. 1 and with further reference to FIG. 2, an automated collimator exchanger 34 is arranged to selectively mechanically switch collimators. Such automated collimator exchangers are known in the art, and a suitable automated collimator exchanger is described in U.S. Pat. No. 5,519,223 issued to Hug, et al. The collimator exchanger 34 includes a collimator exchanger carrousel 36 corresponding to each detector head 14, which contains carriage segments (not shown) that hold collimators that can be detachably installed onto the head 14. A collimator transfer mechanism 38 (see FIG. 2) removes a pair of collimators from the heads 14, retrieves a new collimator pair from the collimator exchanger carrousel 36, and installs the new collimator pair on the detector heads 14.

Figure 3:
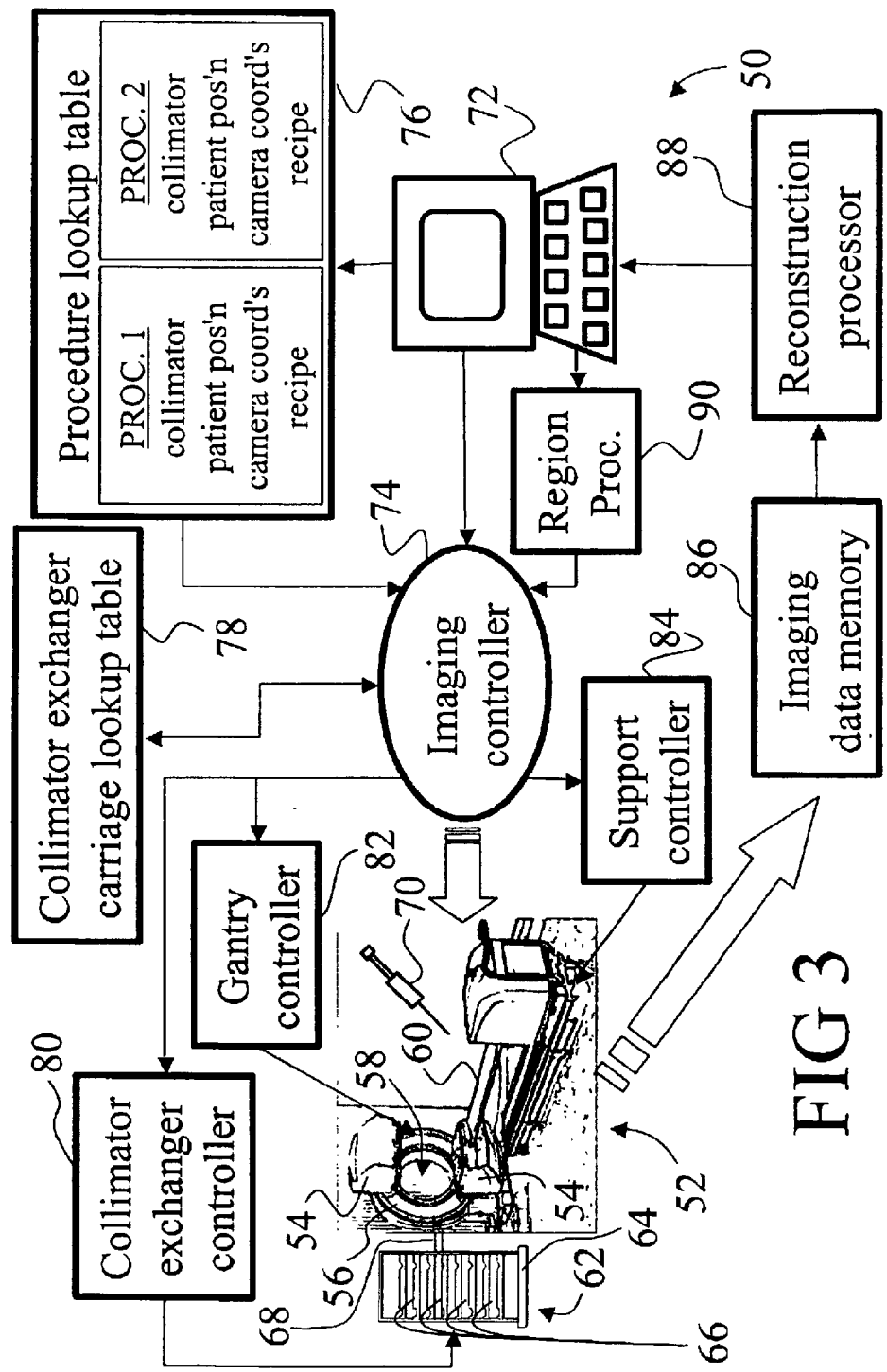
FIG. 3 shows a second embodiment of a nuclear medical imaging apparatus in accordance with an embodiment of the invention.

With reference to FIG. 3, a second nuclear imaging system embodiment 50 employs a gantry-based gamma camera 52. For convenience, corresponding components of the imaging systems 10, 50 are designated with the same reference numbers, while new or substantially different components are assigned different reference numbers. A plurality of detector heads 54, (two heads in FIG. 3) are arranged on a rotating gantry 56. The gantry rotationally positions or dynamically rotates the detector heads 54 relative to an examination region 58 within the interior of the gantry 56. Additionally, each head 54 can be moved toward or away from the patient or tilted about an axis through the head 54. A subject support 60 is linearly movable into the examination region 58 to position an organ of interest within the field of view of the detectors 54, and to perform linear translation in planar or multi-slice tomographic scanning.

An automated collimator exchanger 62 performs selected collimator changeouts. The collimator exchanger 62 includes a carrousel 64 with a plurality of shelves 66 containing collimators that can be detachably installed onto the heads 54. A collimator transfer mechanism 68 removes and installs collimators on the detector heads 54.

Figure 4:
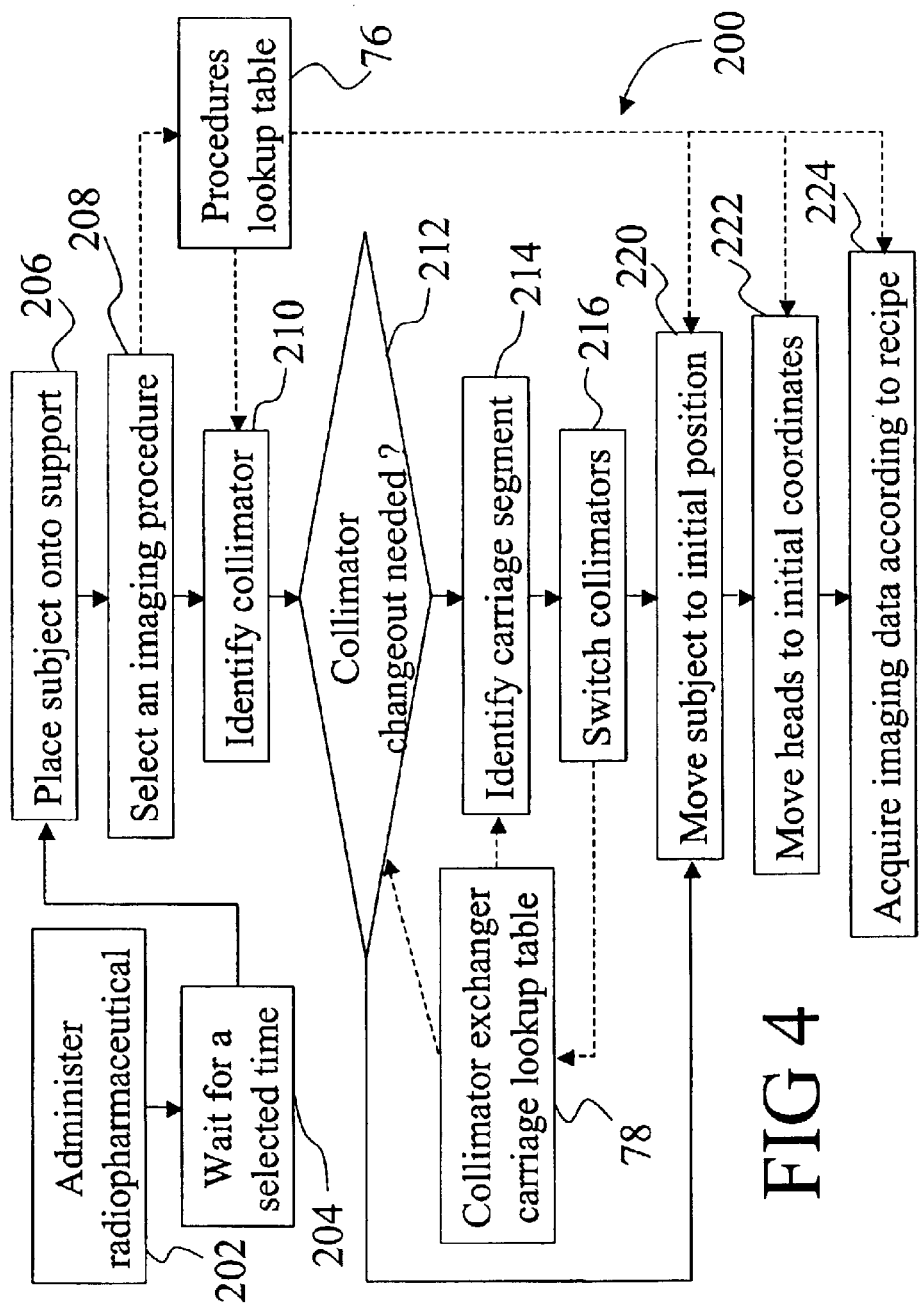
FIG. 4 shows a flowchart of an exemplary nuclear imaging workflow in accordance with an embodiment of the invention.

With returning reference to FIG. 1, continuing reference to FIG. 3, and with further reference to FIG. 4 which describes a suitable nuclear medical imaging workflow 200, a radiopharmaceutical administering means 70 is provided to administer a radiopharmaceutical to a subject in a step 202. In FIGS. 1 and 3 the means 70 is an intravenous injector, e.g. a hypodermic needle. Other means for administering a radiopharmaceutical can be used instead, for example an intravenous drip or a rapid bolus intravenous injection, an orally administered substance such as a pill or a liquid medicine that contains the radiopharmaceutical, an inhaled radiopharmaceutical, an enema radiopharmaceutical administration, or the like.

In nuclear medical imaging, the radiopharmaceutical is typically administered a selected time interval prior to the imaging so as to permit the radiopharmaceutical to disperse into the subject and/or accumulate in the organ or organs of interest. For example, in a bone scan the radiopharmaceutical is typically intravenously injected a selected two to four hours prior to the bone scan imaging session. In view of this selected time delay, the means 70 is optionally located remotely from the gamma camera 12, 52, and the subject transfers to the location of the gamma camera 12, 52 during the selected time delay imposed in a step 204.

Once the radiopharmaceutical is administered 202 and the selected time interval has passed 204 such that the radiopharmaceutical has dispersed and/or accumulated in the organ or organs of interest, the subject is placed onto the support 20, 60 in a step 206, and is preferably stationarily affixed thereto by straps or other fasteners to minimize motion blurring in the subsequent imaging. The operator selects an imaging procedure in a step 208, preferably using a graphical user interface 72. Once the imaging procedure is selected it is implemented automatically by an imaging controller 74.

The imaging controller 74 electronically accesses a procedures lookup table 76 and a collimator carriage lookup table 78. The procedures lookup table 76 includes parameters and other information pertaining to a wide range of imaging procedures. The lookup table 76 stores in electronic memory commonly used nuclear medical imaging procedures such as: various cardiac studies using ECT or planar imaging modalities with or without gating; total body planar scans such as bone scans; various spinal ECT scans; brain ECT scans; vertex brain ECT studies; brain PET scans; foot skeletal scans; GI bleed studies; renal flow and/or LPO/RPO scans; various planar lung scans including PET modalities; thyroid scans; and the like. The listed procedures are exemplary only. The procedures lookup table 76 is preferably modifiable such that parameters and recipes of selected imaging procedures can be periodically updated, and expandable such that additional imaging study procedures can be added or unused (e.g., obsolete) procedures deleted.

For each procedure, the lookup table 76 includes information for setting up the gamma camera 12, 52 for that procedure. This information typically includes: a collimator selection (or a selection of no collimator, e.g. for molecular coincidence detection (MCD)); an initial subject position (e.g. table height and linear position); and initial detector head coordinates. For the gamma camera 12, suitable camera coordinates include a robotic arm/detector head position along the linear track, values for the joints 22 of the robotic arm 16, and a head proximity position relative to the subject.

For the gantry-based gamma camera 52, suitable camera coordinates include positions of the detector heads 54 on the gantry 56, the angular orientation of the gantry 56, a tilt or cant of each detector head 54; and a detector proximity position for each head 54 relative to the subject. Those skilled in the art can select other camera coordinates as appropriate for specific gamma camera arrangements. The procedures lookup table 76 also contains a recipe describing the imaging sequence. The recipe includes information such as a detector head orbit path for tomographic imaging, a linear scan rate for planar imaging, selected head and/or subject support positions for step-and-shoot imaging, and the like.

The collimator exchanger lookup table 78 identifies the contents of the collimator exchanger carrousel 36, 64. Each carriage segment 66 of the collimator exchanger carrousel 36, 64 holds a specific collimator that can be detachably installed onto the corresponding detector head 14, 54 by the collimator exchanger 34, 62. Identification and location information about the collimators is stored in the lookup table 78.

The collimator exchanger lookup table 78 is preferably modifiable so that it can be updated as collimators are added, removed, or rearranged in the collimator exchanger carriage 36, 62. Optionally, the collimator exchanger lookup table 78 identifies the collimator presently mounted on the detector heads 14, 54 and/or indicates that the carriage location 66 corresponding to the presently mounted collimator is empty. This information is updated at each collimator changeout. However, if the heads 14, 54 include sensors that detect and identify the presently mounted collimator (or the lack of a mounted collimator, e.g. in a PET setup) then the collimator exchanger lookup table 78 optionally does not include information on the presently mounted collimator.

With continuing reference to FIGS. 1, 3, and 4, the imaging controller 74 in a step 210 retrieves from the procedures lookup table 76 a collimator identification for the collimator appropriate for the procedure selected in the step 208. At a decision step 212, the imaging controller 74 determines whether a collimator changeout is needed. This determination is made by additionally identifying the presently mounted collimator, either by reading the collimator sensor of the gamma camera 14 or by accessing the collimator exchanger lookup table 78 if that table includes information on the presently mounted collimator.

If at the decision step 212 it is determined that a collimator changeout is called for, the imaging controller 74 accesses the collimator exchanger carriage lookup table 78 in a step 214 to identify a carriage segment that contains the collimator identified in the step 210. The imaging controller 74 directs a camera or gantry controller 82 to move the detector heads 14, 54 into a suitable position for the automated collimator exchange (step not shown).

Information on the presently mounted collimator and the segment identification for the collimator selected in the step 210 is electronically forwarded from the imaging controller 74 to a collimator exchanger controller 80. The collimator exchanger controller 80 controls the collimator exchanger 34, 62, to automatically perform the collimator changeout with respect to the identified collimator segment in a step 216. If information on the presently mounted collimator is maintained in the collimator exchanger lookup table 78, that information is updated in the lookup table 78 to reflect the collimator changeout of the step 216.

Once the collimator has been changed out in the step 216, or after it is determined in the step 212 that the correct collimator is already installed, the imaging controller 74 electronically retrieves an initial position for the subject support 20, 60 from the procedures lookup table 76 contents for the selected procedure. In a step 220, the imaging controller 74 communicates the initial support position to a patient support controller 84 which moves the subject support 20, 60 to the initial position. This initial positioning involves a height adjustment and a linear movement of the table (in the embodiment of FIG. 3) that preferably places the organ of interest within a field of view of the detector heads 14, 54. A typical detector head field of view spans about 15 inches. In constructed embodiments of the invention, it has been found that the field of view is wide enough so that calibration for variations in size between individual subjects is typically unnecessary, and so the procedures lookup table 76 stores an initial support position value that is generally applicable independent of the subject.

For certain imaging procedures, such as selected static planar imaging procedures, the initial position is optionally indicated in the procedures lookup table 76 as an input parameter. In this case the step 220 communicates with the graphical user interface 72 to ask for and receive an initial table position from the operator. An input parameter arrangement can also be used for other parameters which are advantageously supplied by the user, optionally along with a supplied default parameter.

After the patient is moved into initial position in the step 220, appropriate detector head coordinates are retrieved from the procedures lookup table 76. In a step 222 the head coordinates are communicated to the gantry or camera controller 82. The controller 82 moves the detector heads 14, 54 via the overhead track 18, the robotic arms 16, the gantry 56, or other mechanical positioning element to place each gamma camera 14 at the retrieved initial coordinates.

In particular, for the gamma camera 12 the robotic arms 16 and heads 14 are positioned near the organ of interest by the overhead track 18. The joints 22 of the robotic arms 16 are manipulated in accordance with the retrieved coordinates to place the detector heads 14 into a selected angular position and tilt or cant. The heads 14 are moved to a selected proximity to the patient.

For the gantry-based gamma camera 52, the heads 54 are moved on the gantry 56 and the gantry 56 is rotated to the retrieved gantry position such that the heads are positioned at selected angular orientations. Each head is tilted or canted to a retrieved tilt position. The heads 54 are moved to a selected proximity to the patient.

Those skilled in the art will recognize that the imaging procedure set-up steps 210, 212, 214, 216, 220, 222 occur automatically and in an optimal sequence responsive to the operator selecting the imaging procedure in the step 208. In presently constructed embodiments, these set-up steps typically take about 5 minutes, as compared with set-up times of around 15 minutes or more for prior art manual and semi-annual workflows. Furthermore, the set-up steps 210, 212, 214, 216, 220, 222 are automated through electronic accessing of the lookup tables 76, 78 and preferably do not involve intervention of the operator. This frees the operator up to perform other tasks concurrently, such as positioning and administering to the patient, completing paperwork about the upcoming imaging procedure, reviewing patient medical records, or the like.

With the correct collimator mounted and the table and each detector head 14, 54 appropriately initially positioned, the imaging controller 74 retrieves an imaging procedure recipe from the procedures lookup table 76. The recipe contains imaging sequence parameters such as a detector head orbit path for tomographic imaging (which can be a non-circular orbit), a scan rate for planar total body imaging, selected camera and/or subject support positions for step-and-shoot imaging, and the like, along with timing information therefor, which are implemented by the imaging controller 74 communicating with the gantry or camera controller 82 and the patient support controller 84.

It is also contemplated to include one or more intermediate collimator changeouts in the recipe for optimizing selected portions of the imaging session. Such intermediate collimator changeouts are implemented by the imaging controller 74 via the collimator exchanger controller 80 which electronically accesses the collimator exchanger carriage lookup table 78 to identify suitable carriage segments for the exchange.

Imaging data acquired during execution of the recipe in the step 224 is stored in an imaging data memory 86 and reconstructed by a reconstruction processor 88 to form an image representation. The reconstructed image representation is preferably displayed on the graphical user interface 72. Preferably, the recipe includes instructions for returning the detector heads 14, 54 and the subject support 20, 60 to an idle position after the imaging procedure is completed.

With continuing reference to FIGS. 1, 3, and 4, the nuclear camera imaging workflow 200 is readily adapted to performs a plurality of imaging procedures sequentially or in tandem. Those skilled in the art know that certain diagnostic nuclear medical imaging procedures are often performed in tandem. In one common tandem procedure, a total body scan is first performed, and then the operator selects regions in the total body scan that may be of clinical interest for further imaging using an ECT modality, a static planar imaging, or another procedure. The workflow 200 is readily adapted to perform such tandem procedures.

Figure 5:
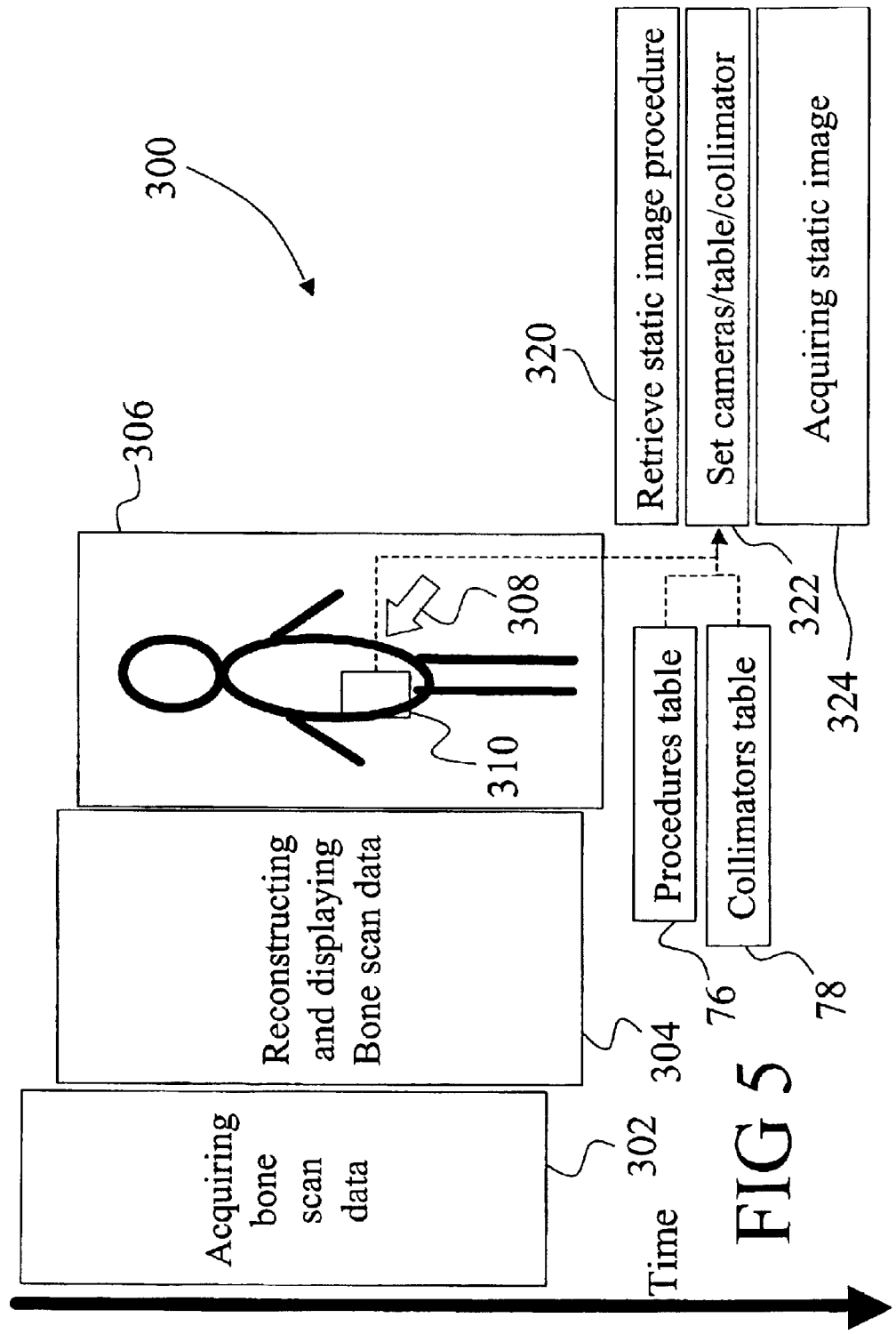
FIG. 5 diagrammatically illustrates an adaptation of the workflow of FIG. 4 to a tandem nuclear imaging procedure.

With continuing reference to FIGS. 1, 3, and 4 and with further reference to FIG. 5, an exemplary tandem imaging procedure 300 combines a total body bone scan with one or more subsequent selective static imaging procedures. A planar total body bone scan is performed over substantially the entire skeleton as described above. The total body planar imaging data is acquired in a step 302, e.g. according to the workflow 200. The bone scan data acquisition 302 occurs over an extended time period, e.g. around an hour or so. The imaging data is concurrently reconstructed 304 by the reconstruction processor 88 during the imaging 302 to generate an image 306 that is displayed on the graphical user interface 72. The displayed image 306 starts as a partial image that grows in resolution. As the detector head moves, the partial images grows to create a whole body image.

As the partial image 306 grows or after the image is complete, the operator typically notices particular areas which may be of clinical interest, such as areas with substantial accumulation of the radiopharmaceutical which may be indicative of bone break down or ongoing skeletal repair. The operator employs a pointing device 308 such as a touch screen or mouse pointer of the graphical user interface 72 to select one or more regions of interest, such as region 310 shown in FIG. 5. A region processor 90 converts the image coordinates designated by the pointing device into gamma camera or patient coordinates.

When the first scan 302 is complete, the imaging controller 74 automatically retrieves 320 a designated static planar imaging procedure from the procedures lookup table 76, such as a close-up, magnified, or higher resolution imaging procedure. The imaging controller also retrieves the location on the patient from the region processor 90. The gamma camera 12, 52 is set-up 322 in accordance with the designated procedure along with subject position information from the pointing device 308.

If the designated procedure calls for a different collimator, the collimator set-up steps 210, 212, 214, 216 are performed for the static imaging procedure as previously described. The subject support and detector head positioning steps 220, 222 are performed as described previously, except that the selected region of interest 310 is substituted by a region processor 90 (see FIGS. 1 and 3) for any default parameters stored in the procedures lookup table 76 that relate to arranging the detector heads 14, 54 relative to an area of the subject. Static planar imaging 324 is performed according to the designated procedure in a step 224 as described previously to acquire the static planar image at the region of interest 310. Optionally, if the user has selected more than one region of interest, the retrieving 320, detector heads set-up 322, and static planar imaging 324 is repeated for each region of interest to obtain a plurality of static planar images. Optionally, the operator can select a tomographic scanning procedure for one or more of the designated regions.

Those skilled in the art will appreciate that the tandem procedure described with reference to FIGS. 1, 3, 4, and 5 significantly increases the imaging speed and reduces user intervention. It will also be appreciated that other tandem procedures can be similarly implemented, such as a tandem of a whole body or a static scan followed by tomographic imaging of selected regions of interest. Additionally, the region of interest can include other types of regions, such as axial, sagittal, or coronal slices, or volume regions of interest.

Although imaging procedures have been described, it is further contemplated to further include quality control or other maintenance procedures in the lookup table 76. Those skilled in the art know that nuclear medical imaging facilities typically perform daily quality control procedures using phantoms or other non-human subjects. These procedures are time consuming, and the set-up for each quality control or other maintenance procedure can involve switching of the collimators, and positioning of the detector heads 14, 54 and the subject support 20, 60 to selected initial positions.

These maintenance procedures are also stored in the procedures lookup table 76. To perform daily quality control, for example, the operator merely selects the quality control procedure, e.g. according to the step 208 of FIG. 6. Responsive to the selection, the collimator changeout (if needed) and subject support and camera positioning is automatically performed according to the steps 210, 212, 214, 216, 220, 222 using parameters stored in the procedures lookup table 76. After these set-up steps, the quality control or other maintenance procedure is performed according to the step 224.

Figure 6:
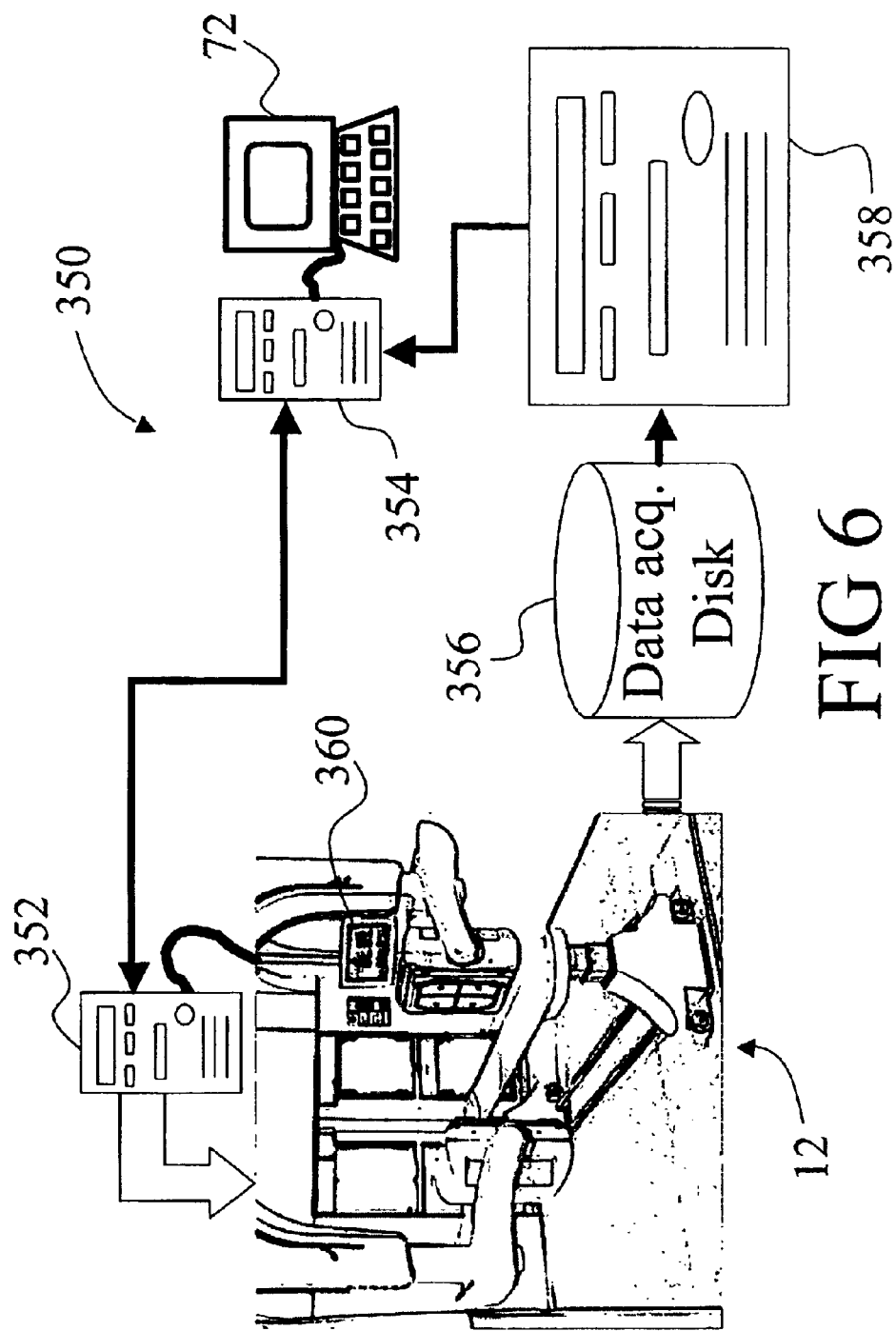
FIG. 6 schematically shows an exemplary construction of the nuclear medical imaging apparatus using a plurality of computers.

With continuing reference to FIG. 1 and with further reference to FIG. 6, the controllers 74, 80, 82, 84 and lookup tables 76, 78 can be physically constructed in a number of ways. In one exemplary suitable arrangement 350 (see FIG. 6) using the gamma camera 12, a gantry personal computer (PC) 352 embodies the collimator exchanger controller 80, camera controller 82, and patient support controller 84 and electronically communicates with the gamma camera 12, while a separate acquisition PC 354 embodies the imaging controller 74, the region processor 90, and the graphical user interface 72.

In the exemplary arrangement 350, the gantry PC 352 performs software scripts that electronically access and control the motions and configurations of the detector heads 14, the patient support 20, and the collimator exchanger 34. The acquisition PC 354 constructs suitable software scripts corresponding to the procedure or procedures selected by the operator from the procedures lookup table 76, and electronically communicates the scripts to the gantry PC 352 for execution. To improve execution speed, the scripts are preferably encoded as interpretive scripts which do not require compilation prior to execution.

In the exemplary arrangement 350 the imaging data memory 86 is embodied as a storage device 356 such as one or more optical or magnetic disks or the like, and the reconstruction processor 88 is embodied on a separate reconstruction computer 358 which can be a PC, UNIX workstation, or the like. Optionally, the storage device 356 is integrated with the reconstruction computer 358.

In the arrangement 350 of FIG. 6, the user controls substantially all aspects of a nuclear medical imaging procedure through the graphical user interface 72 of the acquisition PC 354, including the motions and configurations of the detector heads 14, movement of the patient support 20, and operation of the collimator exchanger 34. Furthermore, most of this control is automated by the procedures stored in the procedures lookup table 76 and the collimator exchanger information stored in the collimator exchanger carriage lookup table 78. These lookup tables are suitably stored in one or more non-volatile storage media of the computers 352, 354. Although the gamma camera 12 is substantially fully controllable via the acquisition computer 354, a display terminal 360 located at or near the gamma camera 12 is preferably connected to the gantry PC 352. The operator can monitor and optionally manipulate camera operations in close proximity to the gamma camera 12 by directly interfacing with the gantry PC 352 via the terminal 360.

The construction arrangement 350 is exemplary only. Those skilled in the art can readily construct other arrangements in which the controllers 74, 80, 82, 84 and lookup tables 76, 78, are embodied on a single computer or are distributed across a plurality of electronically communicating computers in a different arrangement from that shown in FIG. 6. Although discrete connections are shown between the computers 352, 354, 358, it is also contemplated to connect these computers via a network, for example using a dedicated network switch that interconnects the computers 352, 354, 358. In yet another variation, the reconstruction computer 358 can be replaced by a dedicated hardware reconstruction pipeline of application-specific integrated circuits (ASIC's).

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method for setting up and performing a medical imaging session of a subject using a gamma camera, the method comprising:
   selecting an imaging procedure on an input terminal;
   electronically accessing a procedure table to retrieve at least one of: (1) an identification of a collimator to be used with a detector head in the selected imaging procedure, and (2) an initial imaging position of the detector head for the selected imaging procedure;
   electronically identifying a currently mounted collimator that is currently attached to the detector head; and
   automatically controlling at least one of: (1) loading the identified collimator onto the detector head, and (2) positioning the detector head in the identified initial imaging position.

2. The method as set forth in claim 1, wherein the initial detector head position identification includes at least one of:
   an initial detector head rotation angle,
   an initial linear position along the subject,
   an initial radial detector head, position, and
   an initial detector head tilt.

3. The method as set forth in claim 1, further including:
   electronically accessing the procedure table to identify a value for an initial subject support linear position parameter; and
   communicating the initial subject support linear position parameter value electronically from the procedure table to a support controller that effectuates a moving of the subject support to a linear position corresponding to the initial subject support linear position parameter value.

4. The method as set forth in claim 1, further including:
   acquiring first imaging data corresponding to the selected imaging procedure;
   concurrently with the acquiring of the first imaging data, forming an image representation;
   electronically converting the image representation into a human-readable display that grows with the first imaging data acquisition;
   electronically inputting an indication of a region of interest on the human-readable display;
   in response to the input region of interest indication, automatically repositioning the detector head to a corresponding region of the subject; and
   acquiring second imaging data with the detector head positioned at the region of interest.

5. The method as set forth in claim 4, wherein the acquiring of first imaging data includes:
   acquiring planar image data while linearly scanning.

6. The method as set forth in claim 4, wherein the acquiring of second imaging data includes acquiring one of:
   (a) static planar image data including the region of interest, and
   (b) tomographic data of the region of interest.

7. The method as set forth in claim 4, further including after the acquiring of first imaging data but before acquiring the second image data:
   electronically accessing the procedure table to identify a second selected collimator for use with the detector head in the acquiring of second image data; and
   conditional upon the selected collimator differing from the second selected collimator:
      electronically querying the collimator exchanger table to identify a second target location containing the second selected collimator, and
      electronically controlling the collimator exchanger with the identified location to effectuate a removal of the selected collimator and a mounting of the second selected collimator.

8. A method for automatically setting up and performing a medical imaging session of a subject using a gamma camera, the method including:
   selecting an imaging procedure on an input terminal, which step of selecting automatically triggers the steps of:
      electronically accessing a procedure table to retrieve (1) an identification of a collimator to be used with a detector head in the selected imaging procedure, and (2) an initial imaging position of the detector head for the selected imaging procedure;
      electronically identifying a currently mounted collimator that is currently attached to the detector head to determine a collimator mismatch,
      based on the mismatch determination, electronically accessing a collimator exchanger table to identify an empty location and a target location containing the selected collimator, and electronically communicating an identification of the empty and target locations from the exchanger table to an automatic collimator exchanger that effectuates a removal of the currently mounted collimator and a mounting of the selected collimator, and
      automatically controlling positioning the detector head in the identified initial imaging position.

9. The method as set forth in claim 8, wherein the selected collimator is no collimator, the step of electronically accessing the collimator exchanger effectuates removal of the currently mounted collimator without replacement by another collimator.

10. A nuclear imaging apparatus for imaging a patient who has been administered a radiopharmaceutical, the nuclear imaging apparatus comprising:
    a gamma camera including at least one detector head;
    a camera positioning means for positioning the detector head at selected spatial coordinates including at least one angular coordinate;
    an automated collimator exchanger for removing and mounting collimators on the detector head;
    a procedure lookup table containing parameters associated with a plurality of imaging procedures, the parameters for each procedure including at least a collimator identification, starting coordinates for the detector head, and an imaging recipe;
    a graphical user interface; and
    an imaging controller communicating with the gamma camera, the camera positioning means, the collimator exchanger, the procedure lookup table, and the user interface to perform a nuclear imaging method including:
       receiving a selection of a procedure via the graphical user interface,
       retrieving parameters of the selected procedure from the procedure lookup table,
       electronically communicating the retrieved collimator identification to the automated collimator exchanger to effectuate mounting of a corresponding collimator onto the detector head, electronically communicating the retrieved starting coordinates for the detector head to the camera positioning means to effectuate moving of the detector head to the starting coordinates, and acquiring imaging data corresponding to radiation produced by a radiopharmaceutical in the patient; and a reconstruction processor that reconstructs the acquired imaging data into an image representation that is communicated to the graphical user interface for display.

11. The nuclear imaging apparatus as set forth in claim 10, wherein the camera positioning means includes:

a rotating gantry on which the at least one detector head is mounted; and a linear motion element for each detector head that selectively moves the detector head toward or away from the patient.

12. The nuclear imaging apparatus as set forth in claim 10, wherein the camera positioning means includes:

an overhead linear track that moves the detector head in a first linear direction; and a robotic arm for each detector head with a first end connected to the overhead linear track and a second end connected to the detector head, the robotic arm providing a plurality of degrees of positioning freedom for the detector head connected therewith.

13. The nuclear imaging apparatus as set forth in claim 10, further including:

a collimator exchanger lookup table communicating with the imaging controller that identifies collimators stored in a collimator carriage, the step of communicating the retrieved collimator identification to the automated collimator exchanger including:

referencing the collimator exchanger lookup table to select a location of a collimator corresponding to the collimator identification, and communicating the location to the automated collimator exchanger to effectuate mounting of the collimator from the selected collimator location onto the detector head.

14. The nuclear imaging apparatus as set forth in claim 10, wherein the imaging procedure is one of:

a computed tomography recipe that rotates the detector head in a selected orbit about the patient while acquiring imaging data, a planar scanning recipe that acquires imaging data while moving one of the patient support and the detector head to effectuate a linear motion of the detector head relative to the patient, and a static scanning recipe that acquires imaging data while the detector head remains at retrieved coordinates and the patient support remains at retrieved patient support position coordinates.

15. The nuclear imaging apparatus as set forth in claim 10, wherein the procedure lookup table includes at least one quality control recipe for directing a quality control procedure.

16. The nuclear imaging apparatus as set forth in claim 10, wherein the graphical user interface includes a pointing device by which a user identifies a region of interest in the displayed image representation and the method performed by the imaging controller further includes:

retrieving parameters of a second procedure from the procedure lookup table, communicating the collimator identification retrieved for the second procedure to the automated collimator exchanger to effectuate mounting of a corresponding collimator onto the detector head, communicating with the camera positioning means to reposition the detector head relative to the patient such that a field of view of the detector head includes the region of interest, and acquiring second imaging data corresponding to radiation produced by the radiopharmaceutical administered to the patient in accordance with the imaging recipe of the second procedure.

17. A nuclear imaging apparatus for imaging a radiation-emissive subject, the nuclear imaging apparatus comprising:

at least one detector head;

a subject support supporting the subject;

a means for moving and positioning the head relative to the subject;

a camera control means for controlling (1) movements of the detector head, and (2) loading of collimators onto and off the detector head;

an acquisition computer that retrieves a prerecorded gamma camera configuration parameters corresponding to an imaging procedure from a procedure database, and electronically triggers:

(1) identifying a collimator which corresponds to the imaging procedure;

(2) comparing the selected collimator with a currently mounted collimator;

(3) based on the comparison one of:

dismounting the currently mounted collimator and mounting the selected collimator on the detector head in accordance with the configuration parameters for image data acquisition, dismounting the current collimator and not replacing the collimator, and not exchanging the collimator, and (4) moving the head to a starting position;

a reconstruction means for reconstructing imaging data received from the gamma camera during the imaging procedure into an image representation; and a graphical user interface that displays the image reconstruction.

18. The nuclear imaging apparatus as set forth in claim 17, wherein the gamma camera further includes:

an automated collimator exchanger which automatically installs the selected collimator on the detector head in accordance with the preparatory instructions constructed and electronically communicated to the camera control means by the acquisition computer.

19. The nuclear imaging apparatus as set forth in claim 17, wherein the camera control means includes:

a gantry PC that performs a software script received from the acquisition computer to effectuate the imaging procedure including the automatic camera configuration according to the preparatory instructions.

20. The nuclear imaging apparatus as set forth in claim 17, wherein the means for moving and positioning the head relative to the subject includes at least one of:

a rotatable gantry that supports the detector head and rotates the detector head about an examination region, and a robotic arm-and-overhead track arrangement that supports and manipulates the detector head.

21. The nuclear imaging apparatus as set forth in claim 17, wherein the graphical user interface and the acquisition computer combine to define an acquisition PC through which an associated operator retrieves and effectuates the imaging procedure without directly accessing the camera control means.

* * * * *